(12) United States Patent
Lu et al.

(10) Patent No.: US 6,476,473 B1
(45) Date of Patent: Nov. 5, 2002

(54) MEMORY MODULE HAVING BACKUP FUNCTION

(75) Inventors: A Ping Lu, Taipei (TW); Chiaki Kato, 6F-3, No. 189, Sec 2, Keelung Road, Taipei (TW)

(73) Assignee: Chiaki Kato, Taipei (TW)

( * ) Notice: Subject to any disclaimer, the term of this patent is extended or adjusted under 35 U.S.C. 154(b) by 0 days.

(21) Appl. No.: 09/537,227

(22) Filed: Mar. 28, 2000

(30) Foreign Application Priority Data

Mar. 31, 1999 (TW) .......................................... 88105161
Dec. 31, 1999 (TW) .......................................... 88222583

(51) Int. Cl.⁷ ............................................... H01L 23/02
(52) U.S. Cl. ....................... 257/685; 257/692; 257/697
(58) Field of Search ................................. 257/697, 678, 257/723, 685, 686, 692

(56) References Cited

U.S. PATENT DOCUMENTS 5,724,728 A * 3/1998 Bond et al. ................. 257/678

* cited by examiner

Primary Examiner—Roy Potter
(74) Attorney, Agent, or Firm—Jones, Day, Reavis & Pogue

(57) ABSTRACT

The present invention relates to a backup module for a standard memory chip, more especially a standard memory chip (for example, DIP, QFJ and PLCC packages) having high-density pins for the backup of a personal computer. If the standard memory chip is out of order, the backup module according to the present invention can take the place of the standard memory chip. By switching between two or more chips, the capacity of the memory can be effectively increased as a whole and the content (program or data) of the memory can be easily optimized.

20 Claims, 12 Drawing Sheets

Regular pin

Control pin

MEMORY MODULE HAVING BACKUP FUNCTION

BACKGROUND OF THE INVENTION

1. Field of the Invention

The present invention relates to a backup module for a standard memory chip, more especially a standard memory chip (for example, DIP, QFJ and PLCC packages) having high-density pins for the backup of a personal computer. If the standard memory chip is out of order, the backup module according to the present invention can take the place of the standard memory chip. By switching between two or more chips, the capacity of the memory can be effectively increased as a whole and the content (program or data) of the memory can be easily optimized.

2. Description of the Related Art

A general high-density-pin type of memory chip (for example, DIP, QFJ and PLCC packages) is mounted on a base board in plane. For achieving the purpose of backup or increasing the capacity, the mounting of an additional chip would result in the increase of area occupied by the chip so that the whole area of a base board layout is increased and the manufacture cost is increased accordingly. On the other hand, there is a solution by a cubic arrangement. However, a conventional cubic arrangement is designed for special purpose and can not be used widely. Also, the manufacture for cubic arrangement is very complex and the manufacture cost can not be lowered.

In prior art, there is used a memory chip of small sized package for decreasing the area occupied by the chip so that the capacity can be increased. However, the backup chip is not a standard package chip, and the maintain cost would be increased. Since the backup chip is not a standard package chip, the manufacture cost is increased and the usage thereof can not be freely changed. For the user who does not need the backup function, the cost is increased unnecessarily.

There is a conventional system in which the data in memory can be changed. However, when the writing of data is defective, the system has a problem that it can not be started up. Under the circumstance, it is necessary for the maintainer to pull out the chip by detaching the whole system and to rewrite the data in memory by an expensive special memory writer. In addition to the expensive cost, the user needs to spend a lot of time.

For system software engineers who develop BIOS (basic input/output system), it is necessary to prepare a computer system for developing BIOS, a developed computer system for using BIOS and an apparatus for rewriting the content of memory chip. Therefore, the cost is very expensive.

If the source memory chip is arranged at the upper part for discriminating signals from a base board, the base board needs to be designed as having two layers of circuits, In this case, the total height of the base board would be increased excessively and a problem is occurred that an interference between each component is produced.

Up to now, there are two types of standard memories, one type is of rectangular shape (DIP package) and the other type is of square shape (QFJ and PLCC packages). With respect to a rectangular memory, please refer to FIG. 1A showing a situation where a source memory 109 is mounted on a memory socket 111 provided on a base board 110 before a memory module having backup function is used, FIG. 18 shows a prior art memory module having backup function which can be inserted in a memory socket 111 provided on a base board 110, wherein the memory module comprises a first conductor part 101 which can be inserted in the memory socket 111, a first base board 102, a second conductor part 103 which can be connected to a second base board 106, a backup memory 104, a chip (not shown), a third conductor part 105 which can be connected to the first base board 102, a second base board 106 and a memory socket 107. In the case shown in FIG. 18, it is necessary to use two base boards. Therefore, the total height of a memory module having backup function will be increased significantly. Also, the manufacture cost Thereof is very expensive. If the prior art memory module having backup function is designed as having only one single base board as shown in FIG. 1C, the memory module will occupy an area larger than the source memory does. Under the circumstance, the mounting operation of the memory module will be interfered with some other components, and it is necessary to redesign the mother board (printed circuit board).

As to a square memory, please refer to FIG. 2A showing a situation where a source memory 209 is mounted on a memory socket 211 provided on a base board 210 before a memory module having backup function is used. FIG. 2B shows a prior art memory module having backup function which can be inserted in a memory socket 211 provided on a base board 210, wherein the memory module corprises a support part 202, a first conductor part 201, a first base board 203, a chip 204, a backup memory 205, a second conductor part 206, a second base board 207 and a memory socket 208 in which a source memory 209 can be inserted, In the prior art memory module having backup function shown in FIG. 2B, since the chip 204 is mounted beside the backup memory 205, the memory module will occupy an area larger than the source memory does. Therefore, the mounting operation of the memory module will be interfered with some other components, and it is necessary to redesign the mother board (printed circuit board). The detailed structure of the first conductor part 201 and the support part 202 is shown in FIG. 20 The total height of the first conductor part 201 and the support part 202 would be height h1 plus height h2. Accordingly, the total height of the memory module will be increased unnecessarily. Also, the strength of the first conductor part 201 is very week. This would induce a phenomenon that the first conductor part 201 will be bent over after a long-period use.

SUMMARY OF THE INVENTION

An object of the present invention is to provide a memory module having backup function, comprising: a memory connector having a plurality of pins, adapted to be connected to a memory socket; a backup memory having capacity equivalent to that of a source memory, connected to a main system through a plurality of pins of the memory connector; a switching means for selecting a backup memory or a source memory; and a memory socket for inserting a source memory.

In the memory module having backup function according to Embodiment 1 of the present invention, the control pins of the memory connector are lead out from a portion near the control pins of the source memory and are not contacted with the control pins of the source memory.

In the memory module having backup function according to Embodiment 1 of She present invention, the through hole for the control pin of the memory connector and the through hole for the control pin of the source memory are as near as possible.

In the memory module having backup function according to Embodiment 1 of the present invention, an insulator is provided between the control pin of the memory connector and the control pin of the source memory.

Another object of the present invention is to provide a memory module having backup function, characterized by comprising: a memory connector consisting of an inner support part and a lead part, the inner support part having a configuration substantially equivalent to that of a source memory, a hollow chip mounting part being provided in the inner support part for mounting a specific chip, the lead part being adapted to be connected to an original memory socket for connecting with the base board of a backup system; a switching means, for selecting a backup memory or a source memory; a backup memory having capacity equivalent to that of the source memory, connected between the switching means and the main system through the pins of the memory connector; a memory socket for inserting a source memory, connected to the main system through the switching means; and a base board on which a specific chip is mounted, having two or more layers of circuits, one layer of circuit being connected to the memory connector, and the other layer of circuit being connected to the backup memory and the memory socket.

In the memory module having backup function according to Embodiment 2 of the present invention, the inner support part of the memory connector is made of an insulator having on outer configuration similar to the inner configuration of the original memory socket; a plurality of grooves are provided at the periphery of the inner support part; the conductor part is made of a plurality of conductor posts which are adapted to be inserted into the grooves; and the width and height of the conductor posts are slightly more than those of the inner support part.

In the memory module having backup function according to Embodiment 2 of the present invention, the cross section of the grooves provided at the periphery of the inner support part is flask-shaped; the shape of the conductor posts corresponds to that of the grooves; and both ends of the conductor posts are wider than the middle of the conductor posts.

In the memory module having backup function according to Embodiment 2 of the present invention, the specific chip is consisted of a plurality of chips.

In the memory module having backup function according to the present invention, the backup memory can be used to expand memory capacity.

In the memory module having backup function according to the present invention, the backup memory is a DRAM.

In the memory module having backup function according to the present invention, the backup memory is a SRAM.

In the memory module having backup function according to the present invention, the backup memory is a flash ROM.

In the memory module having backup function according to the present invention, the backup memory is a programmable semiconductor chip.

In the memory module having backup function according to the present invention, the switching means is manual.

In the memory module having backup function according to the present invention, the switching means is automatically turned on and off based on the determination of an electrical signal.

With the above structure, an optimistic conductivity can be obtained and the manufacture cost of a memory connector can be reduced. In the memory module having backup function according to the present invention, the signal connection through the memory connector is reliable and stabile.

With the above structure, the connection between the insulator and the conductor is tight Therefore, the conductor will not be moved due to an external force or heat, and the signal transmission in the memory module having backup function according to the present invention is stabile.

When a DRAM is used as a backup memory, BIOS can be easily reset and the manufacture cost can be reduced. When a SRAM is used as a backup memory, BIOS can be fast and easily reset. When a flash ROM is used as a backup memory, user needs not to worry a suddenly shutdown of power. When a programmable semiconductor chip is used as a backup memory, a PAL programmable chip can be replaced and tested for developing a system.

When the switching means is manual, a switch can be provided externally for switching the backup memory and source memory at low cost When the switching means is designed as an automatic switch, the switching between the backup memory and source memory can be achieved based on the determination of an electrical signal.

DETAILED DESCRIPTION OF THE PREFERRED EMBODIMENTS

Figures 1A, 1B:
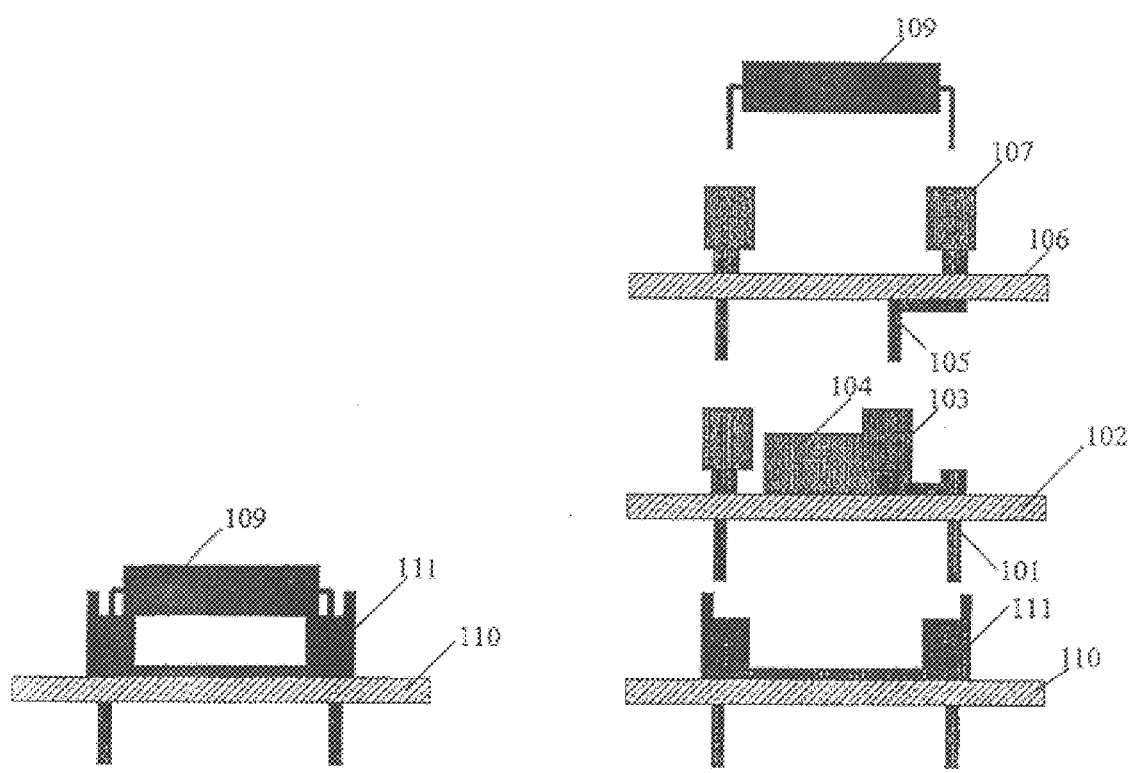
FIG. 1A shows a situation where a rectangular source memory is mounted on a memory socket provided on a base board before a memory module having backup function is used.
FIG. 1B shows a prior art memory module having backup function, wherein the memory module comprises a first conductor, a first base board, a second conductor part, a backup memory, a chip, a third conductor part, a second base board and a memory socket.
Figure 1C:
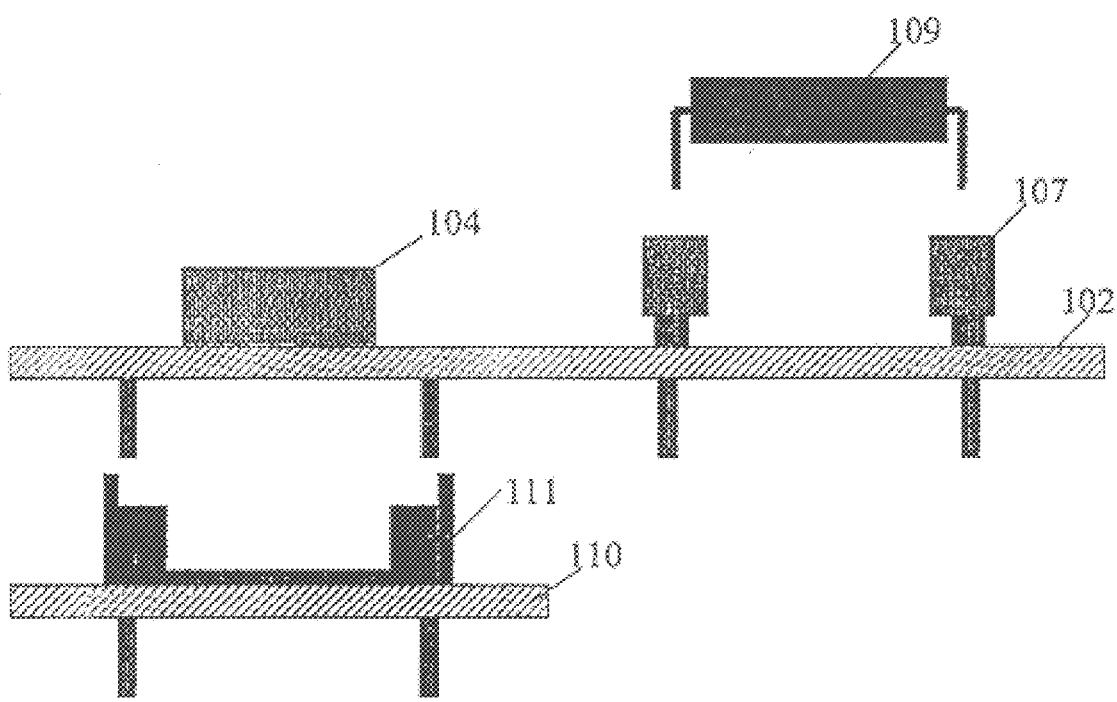
FIG. 1C shows the prior art memory module shown in FIG. 1B when it is redesigned as having only one single base board.
Figures 2A, 2B:
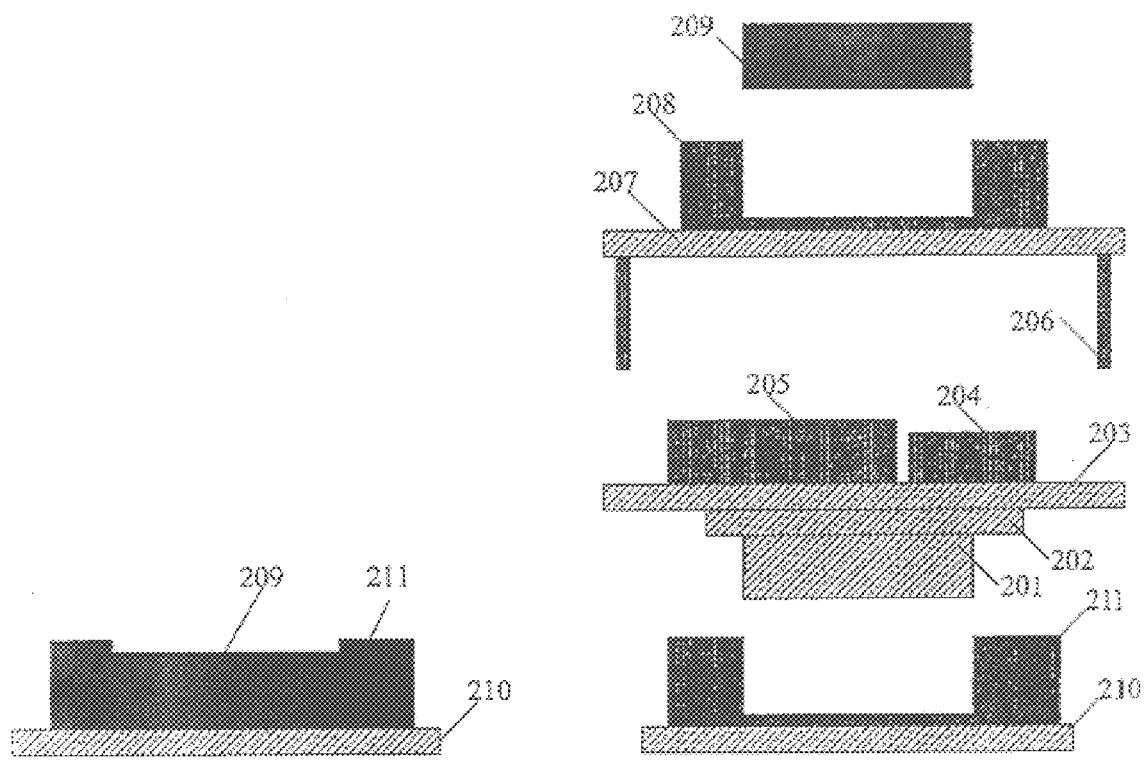
FIG. 2A shows a situation where a square source memory is mounted on a memory socket provided on a base board before a memory module having backup function is used.
FIG. 2B shows a prior art memory module having backup function, wherein the memory module comprises a support part, a first conductor part, a first base board, a chip, a backup memory, a second conductor part, a second base board and a memory socket in which a source memory can be inserted.
Figure 2C:
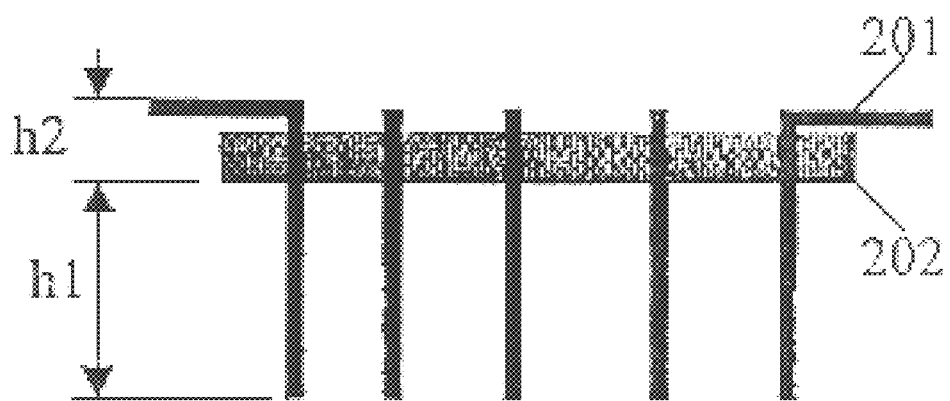
FIG. 2C shows the detailed structure of the first conductor part and the support part.
Figures 3A, 3B, 3C:
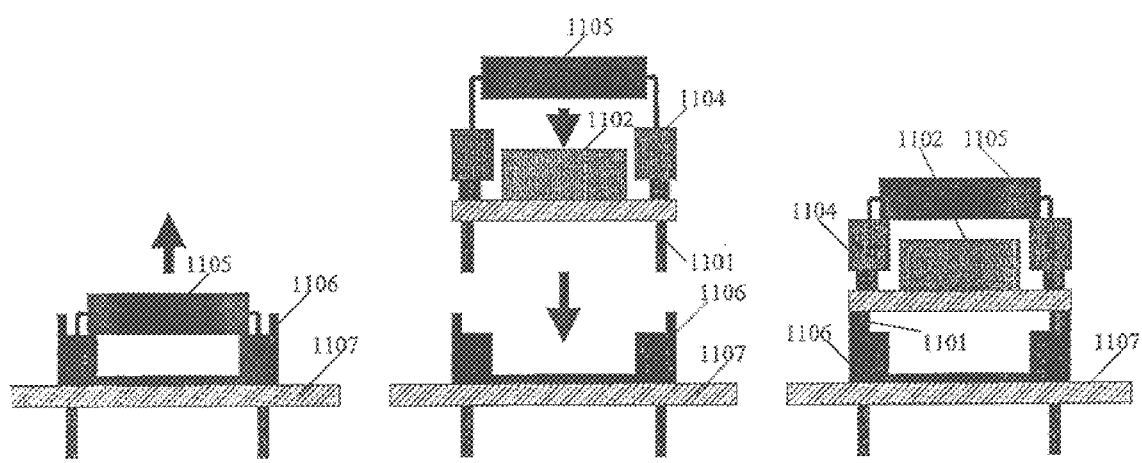
FIG. 3A shows a situation where a rectangular source memory is mounted on a memory socket before a memory module having backup function according to Embodiment 1 of the present invention is used.
FIG. 3B shows a memory module having backup function according to Embodiment 1 of the present invention, which comprises a memory connector, a backup memory, a switching means and a memory socket.
FIG. 3C shows a situation where a rectangular source memory is mounted on a memory module having backup function according to Embodiment 1 of the present invention.

FIG. 3A shows a situation where a rectangular source memory 1105 is mounted on an original memory socket 1106 of a printed circuit board 1107 before a memory module having backup function according to Embodiment 1 of the present invention is used. As shown in FIG. 3B, a memory module having backup function according to Embodiment 1 of the present invention comprises a memory connector 1101, a backup memory 1102, a switching means (not shown) and a memory socket 1104. The memory connector 1101 has a plurality of pins, adapted to be connected to the original memory socket 1106 of a printed circuit board. The backup memory 1102 has capacity equivalent to that of the source memory 1105 and can be connected to a main system through a plurality of pins of the memory connector 1101. The switching means is used for selecting a backup memory 1102 or a source memory 1105. The memory socket 1104 is used for inserting a source memory 1105.

Figures 4A, 4B, 4C:
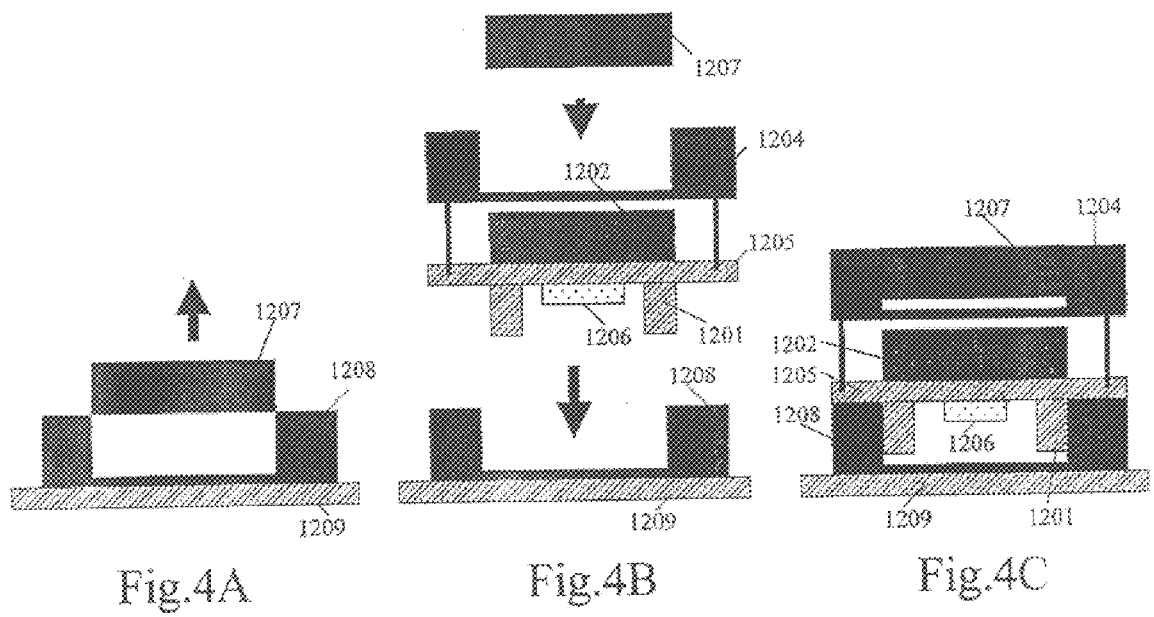
FIG. 4A shows a situation where a square source memory is mounted on a memory socket before a memory module having backup function according to Embodiment 2 of the present invention is used.
FIG. 4B shows a memory module having backup function according to Embodiment 2 of the present invention, which comprises a memory connector, a switching means, a backup memory, a memory socket and a base board.
FIG. 4C shows a situation where a square source memory is mounted on a memory module having backup function according to Embodiment 2 of the present invention.

FIG. 4A shows a situation where a square source memory 1207 is mounted on an original memory socket 1208 of a printed circuit board 1209 before a memory module having backup function according to Embodiment 2 of the present invention is used. As shown in FIG. 4B, a memory module having backup function according to Embodiment 2 of the present invention comprises a memory connector 1201, a switching means (not shown), a backup memory 1202, a memory socket 1204 and a base board 1205. The memory connector 1201 is consisted of an inner support part and a lead part. The inner support has a configuration substantially equivalent to that of a source memory. A hollow chip mounting part is provided in the inner support part for mounting a specific chip 1206. The lead part is connected to the socket of a source memory one hand, and is connected to the base board 1205 of a backup system on the other hand. The switching means is used for selecting a backup memory 1202 or a source memory 1207. The backup memory 1202 has capacity equivalent to that of the source memory 1207. The backup memory 1202 can be connected between the switching means and the main system through the pins of the memory connector 1201. The memory socket 1204 is used for inserting a source memory 1207, and is connected to the main system through the switching means. The base board 1205 on which a specific chip 1206 is mounted has two or more layers of circuits, one layer of circuit is connected to the memory connector 1201, and the other layers of circuits are connected to the backup memory 1202 and the memory socket 1204.

Figure 4D:
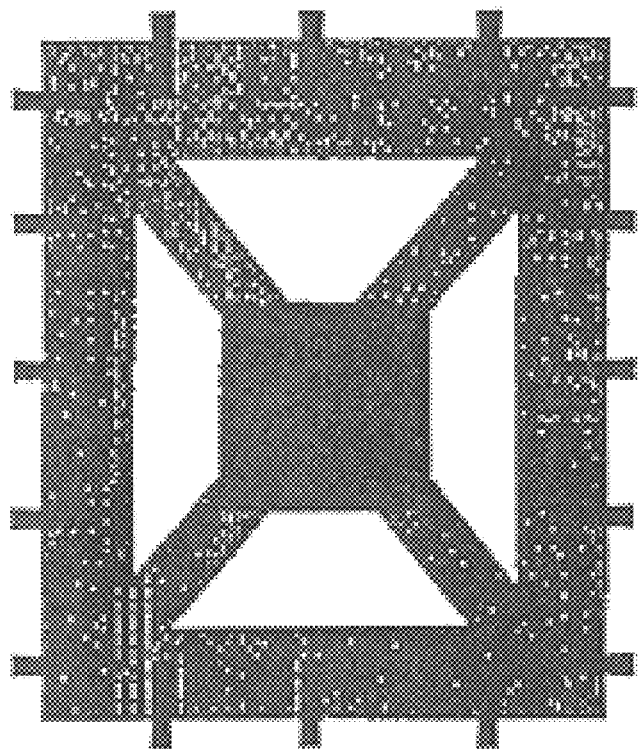
FIG. 4D is a bottom view of the memory module having backup function according to Embodiment 2 of the present invention.

FIG. 4C shows a situation where a square source memory is mounted on the memory module having backup function according to Embodiment 2 of the present invention. Due to the design of the hollow chip mounting part of the inner support part, the specific chip 1206 can be mounted on the back side of the base board 1205 without occupying additional height. FIG. 4D is a bottom view of the memory module having backup function according to Embodiment 2 of the present invention, wherein a X-shaped reinforced part is provided inside the inner support part. The X-shaped reinforced part is used to prevent from the deformation of the inner support part after a long-period use. In addition, the X-shaped reinforced part is good for easily manufacturing as well as assembling.

Figure 5A:
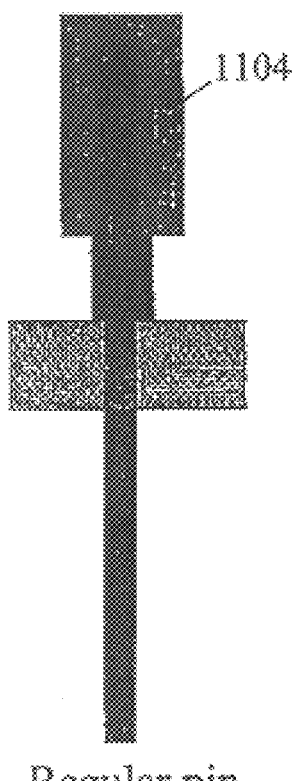
FIG. 5A is a sectional view of the regular pin of the memory connector according to Embodiment 1 of the present invention.
Figure 5B:
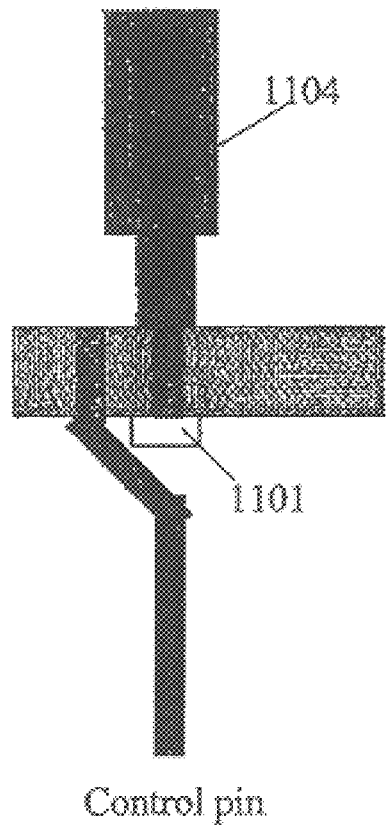
FIG. 5B is a sectional view of the control pin of the memory connector according to Embodiment I of the present invention.

In the memory connector 1101, one type of pins are used as control pins of the memory connector and the other type of pins are regular pins of the memory connector. The sectional view of a regular pin of the memory connector is shown in FIG. 5A, and the sectional view of a control pin of the memory connector is shown in FIG. 513. As shown in FIG. 5B, the control pin of the memory connector is slightly bent from point A so that the control pin of the memory connector is substantial parallel to the memory socket. When the source memory is mounted on the memory socket 1104, the control pin of the source memory is connected to point B in FIG. 513. The distance between point A and point B is designed as short as possible so that the switching between point A and point B can be easily performed and the manufacture cost would be reduced significantly. By switching between point A and point B, the selection of a backup memory or a source memory is performed. The switching between point A and point B can be performed manually by a switching means. Alternatively, the switching between point A and point B can be performed automatically based on the determination of an electrical signal by a specific chip. For avoiding the short circuit between point A and point B, on insulator 1110 is provided at the outside of point B.

Figure 6:
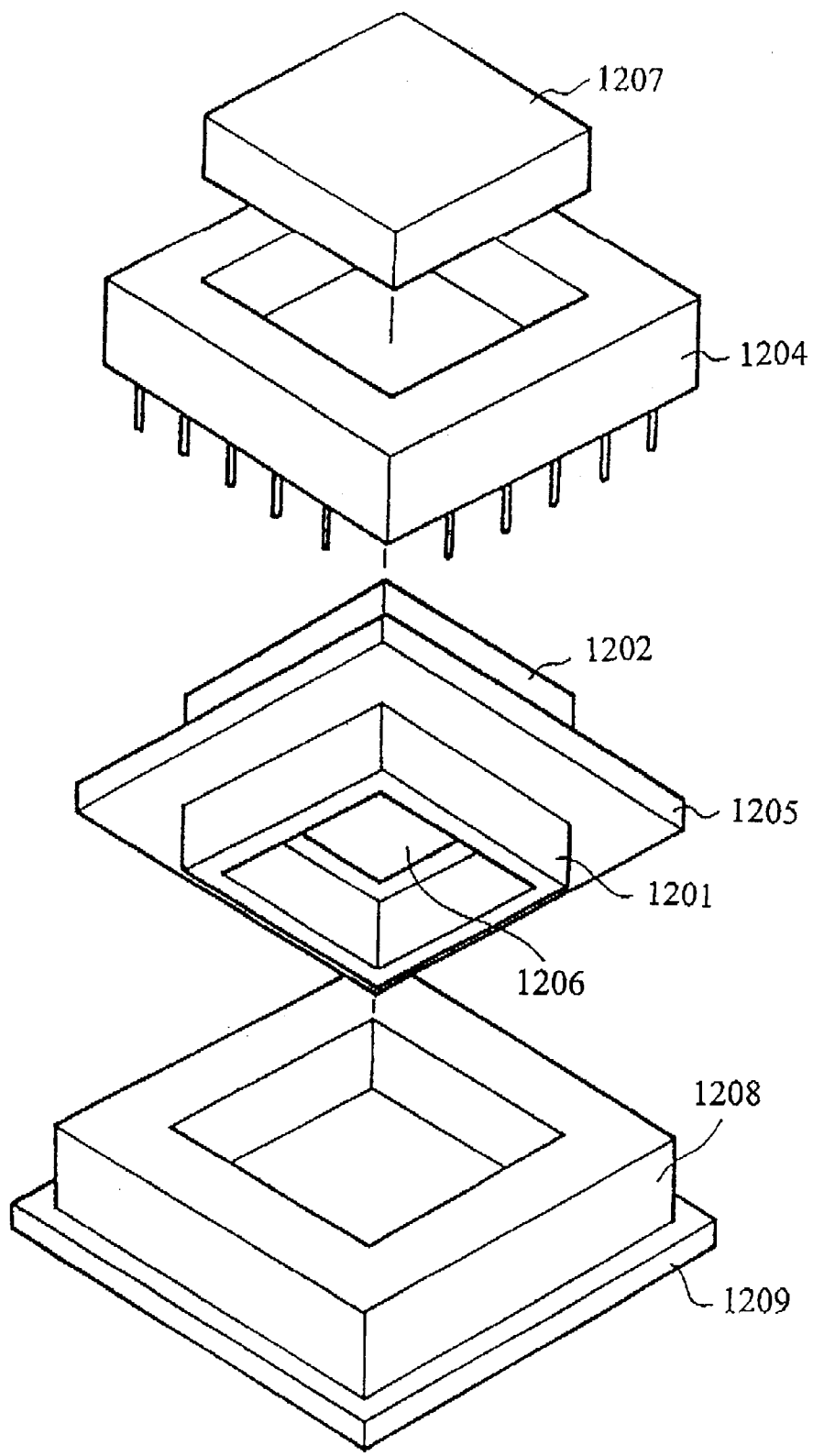
FIG. 6 is an exploded view of FIG. 4C.

FIG. 6 is an exploded view of FIG. 4C. In the memory module having backup function according to Embodiment 2 of the present invention, the backup memory 1202 is mounted on the front side of the base board 1205 and the memory connector 1201 having the inner support part and the lead part is weld on the back side of the base board 1205. On the other hand, the memory socket 1204 is also weld on the front side of the base board 1205. The specific chip 1206 can be mounted inside the inner support part on the back side of the base board 1205. The specific chip 1206 is used for performing the selecting between the source memory 1207 and the backup memory 1202. The specific chip 1206 can be designed with a switching means for performing the selecting between the source memory 1207 and the backup memory 1202 manually by an external switch. Alternatively, the specific chip 1206 can be designed in a way to be consisted of a plurality of chips so that one of the plurality of chips can perform the selecting between the source memory 1207 and the backup memory 1202 automatically based on the determination of an electrical signal.

As shown in FIG. 6, the memory connector 1201 can be mounted on the original memory socket 1208 of the printed circuit board 1209, and then the source memory 1207 can be mounted on the memory socket 1204. Since the memory module according to Embodiment 1 or Embodiment 2 of the present invention occupies an area equal to (not larger than) that the source memory does, the mounting operation of the memory module will not be interfered with some other components on the printed circuit board, and thus it is not necessary to redesign the printed circuit board.

Figure 7A:
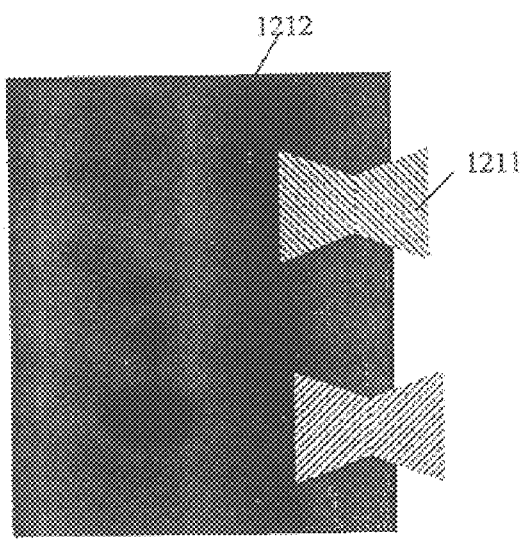
FIG. 7A is a top view of the memory connector according to Embodiment 2 of the present invention.
Figure 7B:
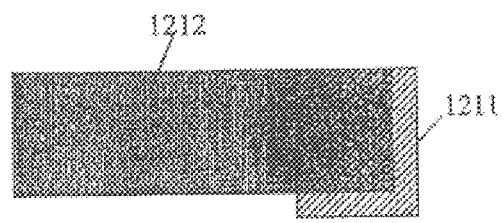
FIG. 7B is a side view of the memory connector according to Embodiment 2 of the present invention.

FIG. 7A is a top view of the memory connector according to Embodiment 2 of the present invention, and FIG. 7B is a side view of the memory connector according to Embodiment 2 of the present invention. The memory connector according to Embodiment 2 of the present invention is consisted of an inner support part and a lead part. The inner support part is made of an insulator 1212 having an outer configuration similar to the inner configuration of the original memory socket 1208. The lead part is consisted of a plurality of conductor posts 1211. In the present invention, the conductor post 1211 is flask-shaped. There are provided a plurality of grooves at the periphery of the insulator 1212 for inserting a plurality of conductor posts 1211. The shape of the conductor post corresponds to that of the groove. With this design, the conductor post will not be easily escaped from the insulator.

Figure 8:
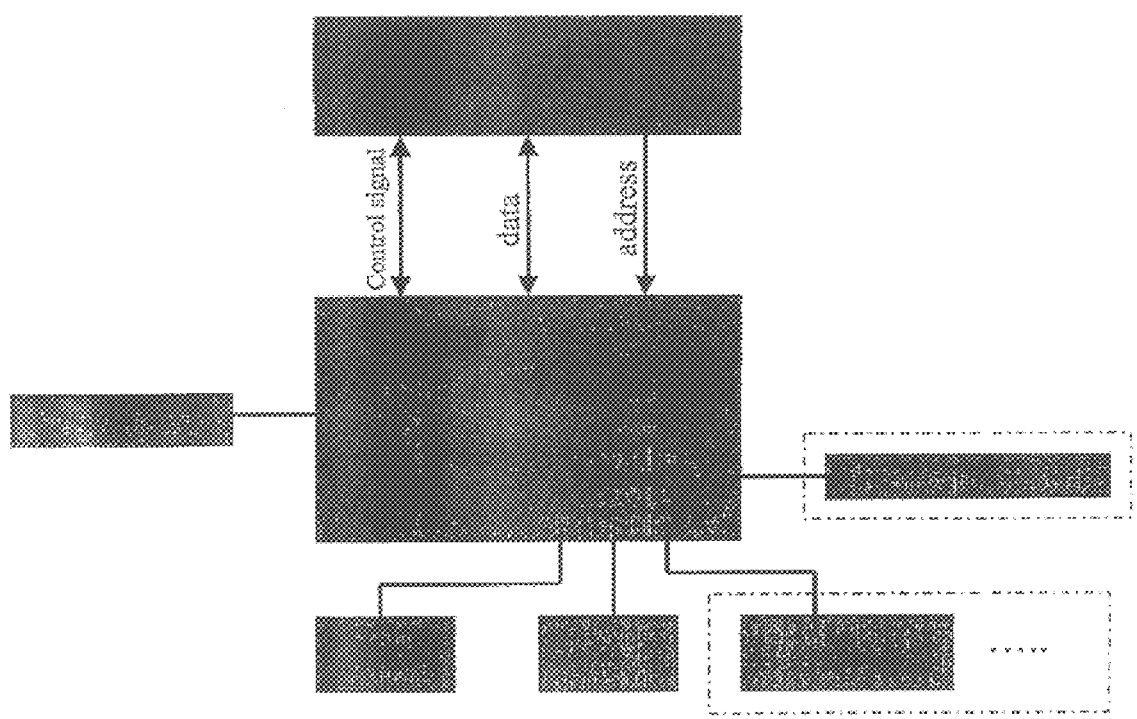
FIG. 8 is a block diagram showing a computer system in which the memory module having backup function according to the present invention is used.

FIG. 8 shows a block diagram of a computer system in which the memory module having backup function according to the present invention is used. The source memory and the backup memory can be selected by the switching means. Though there is described only one backup memory through the specification, an extra backup memory shown in the dash line part of FIG. 8 can be provided depends on needs. The switching means can be provided in the specific chip. Alternatively, an external manual switch shown in the dash line part of FIG. 8 can be used to replace with the switching means. The external manual switch can be connected to the base board through interface terminals.

Figure 9:
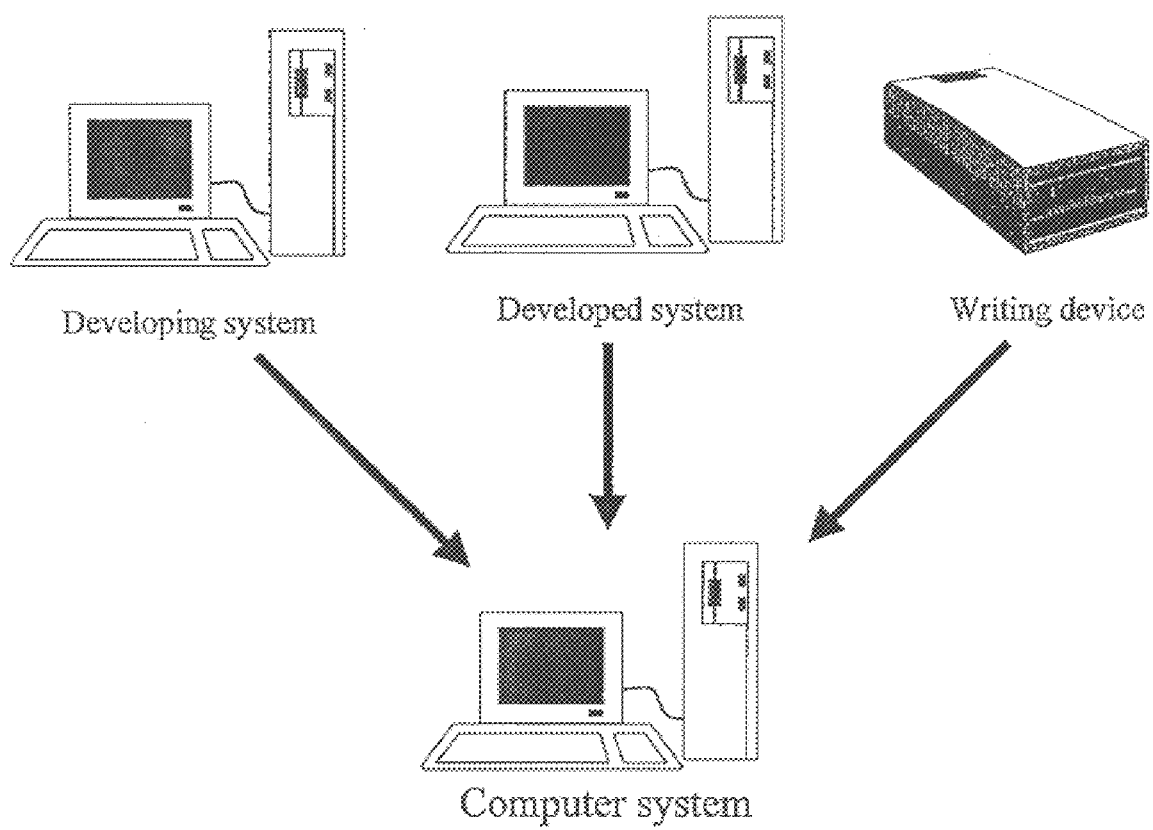
FIG. 9 is a drawing showing that a computer system using the memory module having backup function according to the present invention can be used to replace with a developing computer system, a developed computer system and a writing device for rewriting the content of a memory chip.

As shown in FIG. 9, with the memory module having backup Unction according to the present invention, a system software engineer, who develops BIOS (basic input/output system), can use only one single computer system to replace a developing computer system, a developed computer system and a writing device for rewriting the content of a memory chip.

Please be noted that the specific chip 1206 can be designed to be consisted of a plurality of chips depends on needs. As a backup memory in the present invention, a DRAM, SRAM, flash ROM or programmable semiconductor chip can be used depending on needs. Also, the backup memory can be used to expand memory capacity.

The memory module having backup function according to the present invention has the following advantages: the memory module can be easily mounted on the printed circuit board of a computer system without occupying more area than the source memory does; it is not necessary to redesign a printed circuit board for mounting the memory module; the total height and manufacture cost of the memory module can be significantly reduced since only one base board is used in the memory module; the selecting between a source memory and a backup memory can be performed automatically or manually; a backup memory and an extra backup memory can be used simultaneously depending on needs; and BIOS can be developed or rewritten easily by only one single computer system.

While embodiments of the present invention have been described using specific terms, such description is for illustrative purposes only, and it should be understood that changes and variations may be made without departing from the spirit of scope of the following claims:

What is claimed is:

1. A memory module having backup function, comprising:
    a memory connector having a plurality of pins, adapted to be connected to an original memory socket of a printed circuit board;
    a backup memory having capacity equivalent to that of a source memory, connected to a main system through a plurality of said pins of the memory connector;
    a switching means for selecting a backup memory or a source memory; and
    a memory socket for inserting a source memory.

2. The memory module having backup function according to claim 1, wherein the control pins of the memory connector are lead out from a portion new the control pins of the source memory and are not contacted with the control pin of the source memory.

3. The memory module having backup function according to claim 1, wherein the through hole for the control pin of the memory connector and the through hole for the control pin of the source memory are as near as possible.

4. The memory module having backup function according to claim 3, wherein an insulator is provided between the control pin of the memory connector and the control pin of the source memory.

5. The memory module having backup function according to any one of claims 1 to 3, wherein the backup memory is a DRAM.

6. The memory module having backup function according to any one of claims 1 to 3, wherein the backup memory is a SRAM.

7. The memory module having backup function according to any one of claims 1 to 3, wherein the backup memory is a flash ROM.

8. The memory module having backup function according to any one of claims 1 to 3, wherein the backup memory is a programmable semiconductor chip.

9. The memory module having backup function according to any one of claims 1 to 3, wherein the switching means is manual.

10. The memory module having backup function according to any one of claims 1 to 3, wherein the switching means is automatically turned on and off based on the determination of an electrical signal.

11. A memory module having backup function, characterized by comprising:
    a memory connector consisting of an inner support part and a lead part, the inner support part having a configuration substantially equivalent to that of a source memory, a hollow chip mounting part being provided in the inner support part for mounting a specific chip, the lead part being adapted to be connected to an original memory socket for connecting with the base board of a backup system;
    a switching means, for selecting a backup memory or a source memory;
    a backup memory having capacity equivalent to that of the source memory, connected between the switching means and the main system through the pins of the memory connector;
    a memory socket for inserting a source memory, connected to the main system through the switching means; and
    a base board on which a specific chip is mounted, having two or more layers of circuits, one layer of circuit being connected to the memory connector, and the other layer of circuit being connected to the backup memory and the memory socket.

12. The memory module having backup function according to claim 11, wherein the inner support part of the memory connector is made of an insulator having an outer configuration similar to the inner configuration of the original memory socket; a plurality of grooves are provided at the periphery of the inner support part; the conductor part is made of a plurality of conductor posts which are adapted to be inserted into the grooves; and the width and height of the conductor posts are slightly more than those of the inner support part.

13. The memory module having backup function according to claim 12, wherein the cross section of the grooves provided at the periphery of the inner support part is flask-shaped; the shape of the conductor posts corresponds to that of the grooves; and both ends of the conductor posts are wider than the middle of the conductor posts.

14. The memory module having backup function according to any one of claims 11 to 13, wherein the backup memory is a DRAM.

15. The memory module having backup function according to any one of claims 11 to 13, wherein the backup memory is a SRAM.

16. The memory module having backup function according to any one of claims 11 to 13, wherein the backup memory is a flash ROM.

17. The memory module having backup function according to any one of claims 11 to 13, wherein the backup memory is a programmable semiconductor chip.

18. The memory module having backup function according to any one of claims 11 to 13, wherein the switching means is manual.

19. The memory module having backup function according to any one of claims 11 to 13, wherein the switching means is automatically turned on and off based on the determination of an electrical signal.

20. The memory module having backup function according to any one of claims 11 to 13, wherein the specific chip is composed of a plurality of chips.

* * * * *